(12) United States Patent
Akasaka et al.

(10) Patent No.: US 7,884,300 B2
(45) Date of Patent: Feb. 8, 2011

(54) METHOD OF CARBON NANOTUBE SEPARATION, DISPERSION LIQUID AND CARBON NANOTUBE OBTAINED BY THE SEPARATION METHOD

(75) Inventors: Takeshi Akasaka, Tsukuba (JP); Takatsugu Wakahara, Tsukuba (JP); Yutaka Maeda, Tsukuba (JP)

(73) Assignee: University of Tsukuba, Tsukuba-shi (JP)

( * ) Notice: Subject to any disclaimer, the term of this patent is extended or adjusted under 35 U.S.C. 154(b) by 329 days.

(21) Appl. No.: 11/659,157

(22) PCT Filed: Jul. 29, 2005

(86) PCT No.: PCT/JP2005/013924

§ 371 (c)(1), (2), (4) Date: Feb. 1, 2007

(87) PCT Pub. No.: WO2006/013788

PCT Pub. Date: Feb. 9, 2006

(65) Prior Publication Data

US 2008/0308772 A1  Dec. 18, 2008

Related U.S. Application Data

(60) Provisional application No. 60/592,966, filed on Aug. 2, 2004.

(51) Int. Cl.
*D01F 9/12* (2006.01)

(52) U.S. Cl. ............... 209/127.1; 252/502; 252/510; 423/445 R; 423/447.1; 423/447.2; 524/495; 524/496; 977/751; 977/842; 977/882; 977/895

(58) Field of Classification Search ........... 252/500, 252/510, 502; 423/447.2–460, 445 R, 447.1; 209/127.1; 524/495, 496; 977/751, 842, 977/882, 895
See application file for complete search history.

(56) References Cited

U.S. PATENT DOCUMENTS

| 2001/0010809 A1* | 8/2001 | Haddon et al. ........... 423/447.2 |
| 2004/0232073 A1 | 11/2004 | Papadimitrakopoulos |
| 2007/0280876 A1* | 12/2007 | Tour et al. ............... 423/460 |
| 2008/0260616 A1* | 10/2008 | Tour et al. ............... 423/447.1 |

FOREIGN PATENT DOCUMENTS

JP  06-228824  8/1994

(Continued)

OTHER PUBLICATIONS

Debjit Chattopadhyay, et al., "A Route for Bulk Separation of Semiconducting from Metallic Single-Wall Carbon Nanotubes," JACS Articles, J.Am. Chem. Soc., 2003, 125, pp. 3370-3375.

(Continued)

*Primary Examiner*—Mark Kopec
*Assistant Examiner*—Tri V Nguyen
(74) *Attorney, Agent, or Firm*—Law Office of Katsuhiro Arai (57) ABSTRACT

A method of realizing selective separation of metallic single-walled carbon nanotubes and semiconducting carbon nanotubes from bundled carbon nanotubes; and obtaining of metallic single-walled carbon nanotubes separated at high purity through the above method. Metallic single-walled carbon nanotubes are dispersed one by one from bundled carbon nanotubes not only by the use of a difference in interaction with amine between metallic single-walled carbon nanotubes and semiconducting carbon nanotubes due to a difference in electrical properties between metallic single-walled carbon nanotubes and semiconducting carbon nanotubes but also by the use of the fact that an amine is an important factor in SWNTs separation. The thus dispersed carbon nanotubes are subjected to centrifugation, thereby attaining separation from non-dispersed semiconducting carbon nanotubes.

6 Claims, 4 Drawing Sheets
(2 of 4 Drawing Sheet(s) Filed in Color)

FOREIGN PATENT DOCUMENTS

| | | |
|---|---|---|
| JP | 2001-011344 | 1/2001 |
| JP | 2003-238126 | 8/2003 |
| JP | 2004-168570 | 6/2004 |
| JP | 2004-313906 | 11/2004 |

OTHER PUBLICATIONS

Yuya Hirashima, et al., "Interaction of SWNTs and Amines," Proc. of the National Meeting of the Chemical Society of Japan, Mar. 11, 2004, p. 59.

Philip G. Collins, et al., "Engineering Carbon Nanotubes and Nanotube Circuits Using Electrical Breakdown," Science, vol. 292, Apr. 27, 2001, pp. 706-709.

Ralph Krupke, et al., "Separation of Metallic from Semiconducting Single-Walled Carbon Nanotubes," Science, vol. 301, Jul. 18, 2003, pp. 344-347.

Ming Zheng, et al., "DNA-assisted dispersion and separation of carbon nanotubes," Nature Materials, vol. 2, May 2003, pp. 338-342.

Ming Zheng, et al., "Structure-Based Carbon Nanotube Sorting by Sequence-Dependent DNA Assembly," Science, vol. 302, Nov. 28, 2003, pp. 1545-1548.

Huaping Li, et al., "Selective Interactions of Porphyrins with Semiconducting Single-Walled Carbon Nanotubes," J. Am. Chem. Soc. Jan. 8, 2004, 126, pp. 1014-1015.

Michael S. Strano, et al., "Electronic Structure Control of Single-Walled Carbon Nanotube Functionalization," Science, vol. 301, Sep. 12, 2003, pp. 1519-1522.

Jeffrey L. Bahr et al., "Dissolution of small diameter single-wall carbon nanotubes in organic solvents?", Chem. Commun., 2001, p. 193-194 (Jan. 8, 2001).

C. A. Furtado et al., "Debundling and Dissolution of Single-Walled Carbon Nanotubes in Amide Solvents", J. AM. CHM. SOC. 2004, vol. 126, pp. 6095-6105 (Apr. 24, 2004).

Jing Lu et al, "Why Semiconducting Single-Walled Carbon Nanotubes are Separated from their Metallic Counterparts", Small 2007, vol. 3, No. 9, pp. 1566-1576 (Aug. 20, 2007).

Yutaka Maeda et al., "Large-Scale Separation of Metallic and Semiconducting Single-Walled Carbon Nanotubes", J. AM. CHEM. SOC. 2005, vol. 127, pp. 10287-10290 (Jul. 1, 2005).

* cited by examiner (a) AP-SWNTs (b) SWNTs-M (c) SWNTs-D

Figure 1. SEM images of AP-SWNTs, SWNTs-M, and SWNTs-D.

Figure 2. AFM image and cross-section profile indicared by lines of SWNTs-S.

Figure 3. UV-vis-NIR spectra of AP-SWNTs, SWNTs-S, SWNTs-D, and SWNTs-M.
Inset: Photographys of SWNTs-S (left), and SWNTs-M (right).

Figure 4. Raman spectra of AP-SWNTs and SWNTs-M.

Figure 4. Raman spectra of AP-SWNTs and SWNTs-M.

METHOD OF CARBON NANOTUBE
SEPARATION, DISPERSION LIQUID AND
CARBON NANOTUBE OBTAINED BY THE
SEPARATION METHOD

This application is the U.S. National Phase under 35 U.S.C. §371 of International Application PCT/JP2005/013924, filed Jul. 29, 2005, which claims priority to U.S. Provisional Application No. 60/592,966, filed Aug. 2, 2004. The International Application was published under PCT Article 21(2) in a language other than English.

TECHNICAL FIELD

The present invention pertains to a method of carbon nanotube separation, a dispersion, and carbon nanotubes obtained by said separation method. In particular, the present invention pertains to a separation method whereby metallic single-walled carbon nanotubes are dispersed in a solution and then metallic single-walled carbon nanotubes and semiconducting single-walled carbon nanotubes are separated; a dispersion of metallic single-walled carbon nanotubes obtained by the aforementioned dispersion; and metallic or semiconducting single-walled carbon nanotubes produced by the above separation method.

BACKGROUND ART

Carbon nanotubes offer excellent mechanical and electrical properties. For this reason, they are expected to find applications in a wide range of fields such as electron source materials and conductive resin materials. In particular, there is a strong demand for applications that utilize the excellent electron characteristics of single-walled carbon nanotubes (hereinafter referred to as "SWNTs" in this Specification). However, practical applications have largely been hindered by their poor solubility and dispersibility (owing to the fact that carbon nanotubes are aggregated in a bundled state).

In the technical fields in question, dispersing bundled SWNTs in an organic solvent as individual nanotubes and thereby enabling application of SWNTs in various fields presents a very important technical challenge, and solving this challenge means making homogeneous chemical reaction possible.

Among the conventional technical means to disperse bundled SWNTs, non-covalent interaction and chemical functionalization are known. Examples of specific means to disperse bundled SWNTs are explained below.

The inventors proposed a method whereby SWNTs are sonicated in a mixed solution of sulfuric acid and nitric acid, and then sonicated again in a mixed solution of sulfuric acid and hydrogen peroxide, after which the SWNTs are chemically reacted with an amine in the presence of an organic amine and dehydrating agent to functionalize the SWNTs with the amine and thereby produce SWNTs that can be dissolved in solvents (refer to Patent Literature 1).

It is also known that processing carbon nanotubes containing fluorinated SWNTs in a solvent such as dimethylformamide would change the six-member ring structure and electron state of carbon atoms and consequently improve the hydrogen absorption capability of the material to a significant degree (refer to Patent Literature 2).

Also, a technique is known whereby SWNTs are uniformly dispersed in a solution containing organic polymer material to produce a coating material of high uniformity and this coating material is used to form on the surface of a substrate a uniform layer of a substance that contains SWNTs (refer to Patent Literature 3).

Another method is known whereby carbon nanotubes are dispersed easily and stably, without chemical functionalization, in a dispersion that contains a dispersing agent constituted by a chemical compound having a hydrophobic-hydrophilic structure (refer to Patent Literature 4).

Furthermore, the property of SWNTs dispersing at high content in an organic solvent in the presence of an amine is also known (refer to Non-patent Literature 2).

Although partially overlapping with the examples of prior arts described above, a method has been proposed whereby non-covalent bonds of polymers or 1-conjugated compounds and SWNTs are formed to disperse bundled SWNTs in a non-aqueous solution, without changing the structure or the structures and properties of bond constituents. However, spectroscopic characteristics of such SWNTs dispersed in a non-aqueous solution have not been reported.

In view of the situation, the inventors have proposed, after the application for the basic patent pertaining to the present application for patent, an invention regarding a processing/treatment method wherein bundled SWNTs comprising multiple SWNTs bonded together are added to a tetrahydrofuran solution containing octylamine, after which the solution is given vibration to separate the SWNTs into individual nanotubes to measure their absorption spectra using a spectrophotometer and thereby objectively confirm the degree of separation of bundled SWNTs into individual nanotubes (Japanese Patent Application No. 2004-310231).

In addition, other technical means are known for separating metallic carbon nanotubes and semiconducting carbon nanotubes, such as dielectrophoresis, chromatography, non-covalent interaction, and chemical functionalization. Specific examples of these means are explained below.

For example, a known literature is available that talks about a method to obtain semiconducting carbon nanotubes by utilizing the strong interaction between amines and semiconducting carbon nanotubes, wherein specifically an amine is added to SWNTs to separate semiconducting SWNTs (refer to Non-patent Literature 1). Also, there is another application for patent that was filed in the U.S. prior to the basic application for patent pertaining to the present application for patent (refer to Patent Literature 5). Here, the method described in Non-patent Literature 1 assumes that oxidization is given as a pretreatment, while the invention described in Patent Literature 5 assumes that oxidization or oxidization plus heating to high temperature is given as a pretreatment.

Furthermore, a method for refining carbon nanotubes is known wherein carbon nanotubes placed in a rotating drum are irradiated with electron beam to charge the nanotubes with electricity, and then metallic carbon nanotubes that could not be electrically charged are removed from the rotating drum to separate metallic carbon nanotubes from insulating carbon nanotubes (refer to Patent Literature 6).

In addition, there is a known method to separate semiconducting SWNTs by applying electrical current to SWNTs to selectively burn off metallic SWNTs, thereby removing metallic SWNTs and allowing only semiconducting SWNTs to remain (refer to Non-patent Literature 3).

Another known method of carbon nanotube separation is to conduct dielectrophoresis of SWNTs that have been dispersed with a surfactant, in order to separate metallic SWNTs and semiconducting SWNTs (refer to Non-patent Literature 4). This technique produces 1 pg of metallic SWNTs from 100 ng of a dispersion containing SWNTs (the effective yield is one one-hundred-thousandth of material).

Yet another known separation method involves anion exchange chromatography of a DNA dispersion of SWNTs, in order to separate SWNTs based on different diameters and electrical properties. In spectral analysis, SWNTs with smaller diameters as well as metallic SWNTs flow out more quickly, while SWNTs with larger diameters as well as semiconducting SWNTs flow out more slowly (refer to Non-patent Literatures 5 and 6).

Also, a method is known whereby semiconducting SWNTs are concentrated in a dispersion to a noticeable degree by utilizing the selectivity of a porphyrin derivative with respect to semiconducting SWNTs, which is considered a non-covalent interaction, and thus metallic SWNTs are concentrated preferentially into residue (refer to Non-patent Literature 7).

Furthermore, their electrical properties allow SWNTs to be chemically functionalized with a diazonium reagent with high selectivity, where metallic nanotubes react with diazonium, while semiconducting SWNTs are removed (refer to Non-patent Literature 8).

Patent Literature 1: Japanese Patent Laid-open No. 2004-168570
Patent Literature 2: Japanese Patent Laid-open No. 2004-313906
Patent Literature 3: Japanese Patent Laid-open No. 2001-011344
Patent Literature 4: Japanese Patent Laid-open No. 2003-238126
Patent Literature 5: U.S. Patent Laid-open No. 2004/0232073
Patent Literature 6: Japanese Patent Laid-open No. Hei 6-228824
Non-patent Literature 1: Debjit Chattopadhyay, Izabela Galeska, Fotios Papadimitrakopoulos, "A Route for Bulk Separation of Semiconducting from Metallic Single-Wall Carbon Nanotubes," JACS Articles, J. Am. Chem. Soc., 2003, 125, 11, The Nanomaterials Optoelectronics Laboratory, Department of Chemistry, Polymer Program, Institute of Materials Science, University of Connecticut, pp. 3370-3375, Feb. 22, 2003
Non-patent Literature 2: Yuya Hirashima, Shin-ichi Kimura, Yutaka Maeda, Tadashi Hasegawa, Takatsugu Wakahara, Takeshi Akasaka, Tetsuo Shimizu, Hiroshi Tokumoto, "Interaction of SWNTs and Amines," Proc. of the National Meeting of the Chemical Society of Japan, the Chemical Society of Japan, Mar. 11, 2004, p. 59
Non-patent Literature 3: P. G. Collins, M. S. Arnold, P. Avouris, Science, 2001, 292, Apr. 27, 2001, pp. 706-709
Non-patent Literature 4: R. Krupke, F. Hennrich, H. V. Lohneysen, M. M. Kappes, Science, 2003, 301, Jul. 18, 2003, pp. 344-347
Non-patent Literature 5: M. Zheng, A. Jagota, E. D. Semke, B. Diner, R. Mclean, S. R. Lustig, R. E. Richardson, N. G. Tassi, Nature Mater., 2003, 2, May 1, 2003, pp. 338-342
Non-patent Literature 6: M. Zheng, A. Jagota, M. S. Strano, A. P. Santos, P. Barone, S. G. Chou, B. A. Diner, M. S. Dresselhaus, R. S. Mclean, G. B. Onoa, G. G. Samsonidze, E. D. Semke, M. Usrey, D. J. Walla, Science, 2003, 302, Sep. 28, 2003, pp. 1545-1548
Non-patent Literature 7: H. Li, B. Zhou, Y. Lin, L. Gu, W. Wang, K. A. S. Fernando, S. Kumar, L. F. Allard, Y. P. Sun, J. Am. Chem. Soc., 2004, 126, Jan. 8, 2004, pp. 1014-1015
Non-patent Literature 8: M. S. Strano, C. A. Dyke, M. L. Usrey, P. W. Barone, M. J. Allen, H. Shan, C. Kittrell, R. H. Hauge, J. M. Tour, R. E. Smalley, Science, 2003, 301, Sep. 12, 2003, pp. 1519-1522

SUMMARY OF THE INVENTION

Problems to be Solved by the Invention

In general, SWNTs are synthesized as a mixture of metallic SWNTs and semiconducting SWNTs due to diameter and chirality. Dispersing and separating metallic SWNTs and semiconducting SWNTs by focusing on their respective electrical characteristics provides a very useful technical means to obtain individual SWNTs.

As shown in the aforementioned literatures, several methods have been proposed for dispersing carbon nanotubes. Although methods to disperse carbon nanotubes in solvents are known, however, problems associated with, or technical means to achieve, separation of metallic SWNTs and semiconducting SWNTs with high selectivity are not yet known.

For example, Patent Literatures 1, 3, 4 and Non-patent Literature 2 disclose techniques to simply disperse carbon nanotubes in solvents, etc., but none of them discloses problems associated with, or technical means to achieve, separation of metallic SWNTs and semiconducting SWNTs.

Also, while Patent Literature 2 discloses processing of carbon nanotubes containing fluorinated SWNTs in a solvent such as dimethylformamide, this is aimed at significantly improving the hydrogen absorption capability of the material, which has nothing to do with the problems associated with, or technical means to achieve, separation of metallic carbon nanotubes and semiconducting carbon nanotubes with high selectivity.

Also, Non-patent Literature 1 and Patent Literature 5 aim to primarily obtain semiconducting carbon nanotubes, by focusing on the strong interaction between amines and semiconducting carbon nanotubes and thereby dispersing semiconducting carbon nanotubes in a dispersion, which is then centrifuged to obtain separated semiconducting carbon nanotubes in a supernatant. As a pretreatment, oxidization is required under the method in Non-patent Literature 1, while oxidization or oxidization plus heating to high temperature is required under the method in Patent Literature 5.

However, these pretreatments cause carbon nanotubes to generate fine defects, etc. At any rate, both Non-patent Literature 1 and Patent Literature 5 require a cumbersome pretreatment process, cause carbon nanotubes to generate fine defects due to oxidization, and also present a problem of reduced physical properties.

The technique disclosed in Patent Literature 6 is to separate metallic carbon nanotubes from insulating carbon nanotubes by charging carbon nanotubes with electricity. To do this, however, a facility is needed to irradiate electron beam, and uniformly irradiating electron beam onto carbon nanotubes is not necessarily feasible. As a result, it is unlikely that sufficient separability can be achieved.

It is an object of the present invention to solve the aforementioned problems associated with prior arts, and specifically, the problem of the present invention is to achieve a method to separate metallic SWNTs and semiconducting SWNTs with high selectivity and use this method to obtain pure metallic SWNTs and semiconducting SWNTs that have been separated from each other.

Incidentally, Non-patent Literatures 3 through 8 disclose separation of metallic SWNTs and semiconducting SWNTs by means of concentrating semiconducting SWNTs and/or metallic SWNTs. On the contrary, the problem of the present invention is to achieve a technique to separate both SWNTs completely, or in particular, separate metallic SWNTs at high purity.

Means for Solving the Problems

To solve the aforementioned problems, the present invention provides a method of carbon nanotube separation by dispersing metallic carbon nanotubes among carbon nanotubes and then separating such metallic carbon nanotubes from carbon nanotubes that did not disperse; wherein the method is characterized by comprising: a step of adding to an amine solution the carbon nanotubes from which metallic carbon nanotubes are to be dispersed; a step of dispersing the metallic carbon nanotubes in the amine solution by means of sonication; and a step of separating non-dispersible carbon nanotubes by means of centrifugation or filtration.

To solve the aforementioned problems, the present invention provides a method of carbon nanotube separation by dispersing metallic carbon nanotubes among carbon nanotubes and then separating such metallic carbon nanotubes from semiconducting carbon nanotubes that did not disperse; wherein the method is characterized by comprising: a step of adding to an amine solution the carbon nanotubes from which metallic carbon nanotubes are to be dispersed; a step of dispersing in the amine solution by means of sonication the metallic carbon nanotubes that interact with amines more strongly than the semiconducting carbon nanotubes due to their strong electron-accepting ability; and a step of separating the non-dispersible semiconducting carbon nanotubes by means of centrifugation or filtration.

To solve the aforementioned problems, the present invention provides a method of carbon nanotube separation by dispersing carbon nanotubes and then separating the carbon nanotubes; wherein the method is characterized by comprising: a step of adding the carbon nanotubes to a solution of a substance that intermolecularly interacts with the carbon nanotubes; a step of dispersing the carbon nanotubes in the solution; and a step of separating non-dispersible carbon nanotubes.

It is desirable that the amine solution contain a solvent amphiphilic with amines.

It is desirable that the amine solution be a primary amine, secondary amine, tertiary amine or aromatic amine solution.

It is desirable that the solution of a substance that intermolecularly interacts with the carbon nanotubes contain a solvent amphiphilic with the substance.

It is desirable that the step of separating non-dispersible carbon nanotubes be implemented by means of centrifugation, filtration or sedimentation.

It is desirable that the carbon nanotubes be SWNTs.

It is desirable that separation be controlled in the step of separating non-dispersible carbon nanotubes, by changing the specific gravity of the solvent in the solution in which metallic carbon nanotubes are dispersed.

The step of separating non-dispersible carbon nanotubes may be comprised by selective separation of the semiconducting carbon nanotubes by diameter by utilizing the fact that the semiconducting carbon nanotubes have different electrical characteristics in accordance with their diameter.

To solve the aforementioned problems, the present invention provides a dispersion of metallic carbon nanotubes dispersed in an amine solution to which carbon nanotubes have been added.

It is desirable that the amine solution constituting the dispersion be a primary amine, secondary amine, tertiary amine or aromatic amine solution.

It is desirable that the carbon nanotubes in the dispersion be SWNTs.

To solve the aforementioned problems, the present invention provides metallic or semiconducting carbon nanotubes produced by dispersing metallic carbon nanotubes among carbon nanotubes and then separating such dispersed metallic carbon nanotubes from non-dispersible semiconducting carbon nanotubes; wherein the carbon nanotubes are added to an amine solution, after which the metallic carbon nanotubes are dispersed in the amine solution by means of sonication, and then the dispersed metallic carbon nanotubes are separated from non-dispersible semiconducting carbon nanotubes by means of centrifugation or filtration.

To solve the aforementioned problems, the present invention provides metallic or semiconducting carbon nanotubes produced by dispersing metallic carbon nanotubes among carbon nanotubes and then separating said dispersed metallic carbon nanotubes from non-dispersible semiconducting carbon nanotubes; wherein the carbon nanotubes are added to an amine solution, after which the metallic carbon nanotubes that interact with amines more strongly than the semiconducting carbon nanotubes due to their strong electron-accepting ability are dispersed in the amine solution by means of sonication, and then the dispersed metallic carbon nanotubes are separated from non-dispersible semiconducting carbon nanotubes by means of centrifugation or filtration.

To solve the aforementioned problems, the present invention provides metallic or semiconducting carbon nanotubes produced by dispersing metallic carbon nanotubes among carbon nanotubes and then separating said dispersed metallic carbon nanotubes from non-dispersible semiconducting carbon nanotubes; wherein the carbon nanotubes are added to a solution of a substance that intermolecularly interacts with the carbon nanotubes, after which the metallic carbon nanotubes are dispersed in the solution by means of sonication, and then the dispersed metallic carbon nanotubes are separated from non-dispersible semiconducting carbon nanotubes.

It is desirable that the amine solution used with the metallic or semiconducting carbon nanotubes be a primary amine, secondary amine, tertiary amine or aromatic amine solution.

It is desirable that the metallic or semiconducting carbon nanotubes be SWNTs.

EFFECTS OF THE INVENTION

The present invention allows metallic SWNTs and semiconducting SWNTs to be selectively separated from each other by utilizing the different interactions of metallic SWNTs and semiconducting SWNTs with amines and other substances, due to the different electrical characteristics of metallic SWNTs and semiconducting SWNTs.

In particular, the present invention adopts amines and other substances having stronger interaction with metallic SWNTs than with semiconducting SWNTs, which permits dispersing in a dispersion of metallic SWNTs as individual nanotubes, which can then be separated to obtain individual high-purity metallic SWNTs for direct use in intended applications.

The present invention does not require any pretreatment of SWNTs to be separated. In other words, there is no need to oxidize SWNTs to be separated, nor oxidize and then heat them to high temperature, prior to the main process. This not only eliminates the cumbersome pretreatment process, but also prevents carbon nanotubes from generating fine defects, etc., due to oxidization or losing their physical properties as a result of pretreatment.

Under the present invention, the specific gravity of the solvent in the amine solution (dispersion) can be adjusted appropriately to control the quantity to be separated, separation ratio, separation efficiency, separation speed, etc., when semiconducting SWNTs that did not disperse are sedimented by means of centrifugation, etc.

Also, a large quantity of high-purity metallic SWNTs can be obtained through dispersion and separation in an easy manner, without using any special facility to generate electron beam, etc., as required in the prior arts that separate SWNTs based on their electrical characteristics.

Unlike under the conventional techniques, amines are not functionalized to carbon nanotubes through chemical reaction, which means that amines can be easily removed from the obtained metallic SWNTs that have been separated. This opens the door to carbon-nanotube-based applications in nanomaterial in various industrial fields.

BRIEF DESCRIPTION OF THE DRAWINGS

The patent or application file contains at least one drawing executed in color. Copies of this patent or patent application publication with color drawing(s) will be provided by the Office upon request and payment of necessary fee.

BEST MODE FOR CARRYING OUT THE INVENTION

The best mode for carrying out the present invention is explained below based on an example by referring to the drawings.

The present invention provides a method to selectively separate bundled SWNTs into metallic SWNTs and semiconducting SWNTs by utilizing the different interaction between amines and metallic SWNTs from the interaction between amine and semiconducting SWNTs, where the difference is due to the different electrical characteristics of metallic SWNTs and semiconducting SWNTs. The present invention also pertains to a dispersion of metallic SWNTs produced by the process conforming to the aforementioned method, as well as metallic SWNTs and semiconducting SWNTs separated by the aforementioned method.

As described earlier, traditionally several methods have been used to separate carbon nanotubes based on their electrical characteristics. However, none of them provides a perfect solution. The present invention provides a solution to the problems associated with the traditional methods. When SWNTs are added to a solution containing an amine (amine solution), the amine provides negative charge density on the surface of SWNTs.

Regarding the combination of an amine and SWNTs (also referred to as "amine-SWNTs" in this Specification), it is considered that electron distribution occurs between the SWNTs and the amine on the surface of SWNTs, which then causes interaction between the amine and the metallic SWNTs, which is stronger than the interaction occurring between the amine and the semiconducting SWNTs due to the strong electron-accepting ability of metallic SWNTs.

To be specific, metallic SWNTs in amine-metallic SWNTs have stronger electron-accepting ability with respect to the nitrogen electrons that constitute the amine. As a result, the charge density of the hydrogen component of the amine decreases and consequently electrons are supplied from metallic SWNTs to compensate for the electron deficiency in the hydrogen component of the amine. As a result, strong interaction generates between the amine and the metallic SWNTs.

Having such strong interaction, amine-metallic SWNTs become an important factor in the separation of SWNTs based on the electrical characteristics of amines, as these bundled metallic SWNTs are dispersed (unbundled) into individual nanotubes. By centrifuging the dispersion of these metallic SWNTs, individual metallic SWNTs existing in a dispersed state are separated from semiconducting SWNTs.

EXAMPLE

An example of the present invention is explained below. 1 mg of SWNTs in which metallic SWNTs and semiconducting SWNTs are mixed in bundled state (commercially available "HiPco Tube" (brand name) was used in this example) was added to an amine solution that functions as a dispersion (dispersing agent).

In this example, the amine solution is an octylamine solution, where 10 ml of an octylamine tetrahydrofuran solution (THF/octylamine solution) is used that contains a 1.0M solution of THF as a solvent. This way, the amine exhibits stronger interaction with metallic SWNTs.

Thereafter, the solution was sonicated at room temperature for two hours. This causes bundled SWNTs to be dispersed (unbundled), and metallic SWNTs to which the amine is physically adsorbed via strong interaction do not return to a bundled state but remain dispersed in the dispersion, while semiconducting SWNTs remain entangled with one another and do not disperse. As a result, the dispersion finally contains dispersed metallic SWNTs and non-dispersible semiconducting SWNTs (non-dispersible SWNTs). SWNTs obtained by filtering this dispersion are referred to as "AP-SWNTs" in this Specification.

Next, the dispersion is centrifuged for 12 hours with a force of 45,620 G (to be specific, for example, the dispersion is filled in a test tube, and then the test tube is suspended from a rotating disc and the disc is rotated). This allows semiconducting SWNTs (non-dispersible SWNTs), clustered in a non-dispersible state and thus having a greater specific gravity, to precipitate as sediment (SWNTs-D), while metallic SWNTs remain dispersed in the supernatant of the dispersion. As a result, metallic SWNTs and semiconducting SWNTs are separated. This dispersion containing metallic SWNTs, that is, the supernatant containing metallic SWNTs in a dispersed state, is referred to as "SWNTs-S" in this Specification.

Experimental Examples

To confirm the effects of the present invention in the aforementioned example, the following measurements and experiments were conducted. The results are explained below by referring to FIGS. 1 through 4.

Figure 1:
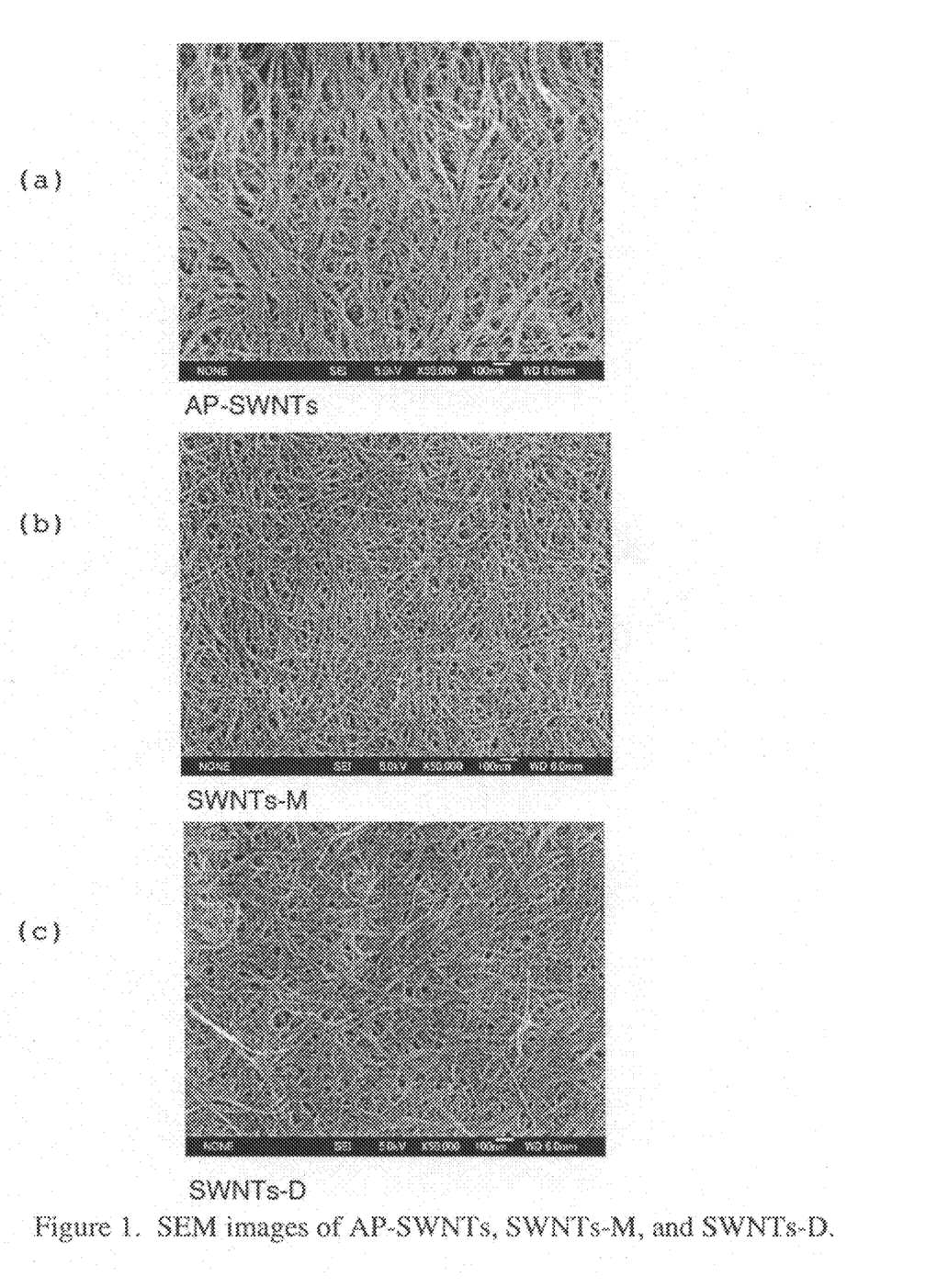
FIG. 1 provides scanning electron microscope (SEM) images where (a) shows SWNTs obtained by filtering a sonicated dispersion (AP-SWNTs), (b) shows SWNTs-S, and (c) shows SWNTs-D, respectively.

FIGS. 1 (a) through (c) provide scanning electron microscope photographs of AP-SWNTs, SWNTs-S obtained by the separation method explained in the aforementioned example (supernatant in which metallic SWNTs are contained in a dispersed state), and a sediment of non-dispersible SWNTs (SWNTs-D), respectively. According to FIG. 1, metallic SWNTs have high purity.

Figure 2:
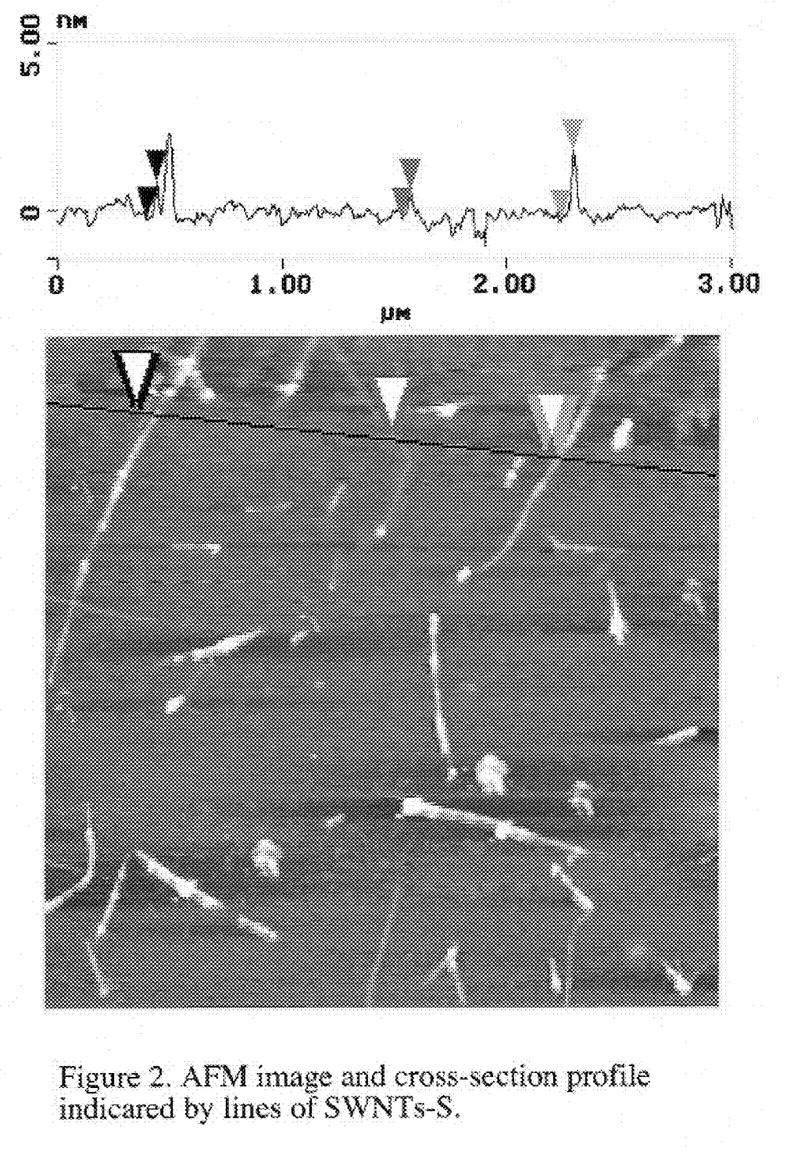
FIG. 2 provides an atomic force microscope (AFM) image, and a cross-section view, of a supernatant containing dispersed metallic SWNTs obtained by centrifuging a sonicated dispersion (SWNTs-S).

The bottom photograph in FIG. 2 is an atomic force microscope (AFM) photograph of SWNTs-S obtained by the separation method explained in the aforementioned example, after collecting SWNTs-S on a mica plate and then drying them using nitrogen gas.

According to this photograph in FIG. 2, dispersed individual metallic SWNTs exist in the octylamine tetrahydrofuran solution (THF/octylamine solution), where these metallic SWNTs are individual SWNTs that have been very efficiently unbundled from bundled SWNTs.

The diameters of metallic SWNTs are known to be in a range of 0.9 to 1.3 nm from FIG. 4 (for details, refer to paragraph 0084 later). From the AFM analysis in FIG. 2, since the diameters (thicknesses) of metallic SWNTs are typically in a range of approx. 0.9 to 1.3 nm, metallic SWNTs are likely in a dispersed, individual state.

The top graph in FIG. 2 shows the heights of metallic SWNTs as measured by scanning these SWNTs along the straight lines shown in the photograph in FIG. 2 using an atomic force microscope (AFM) probe. In this graph, the horizontal axis represents the unit of length corresponding to the photograph, while the vertical axis represents the height detected by the probe. The arrows in the graph show the heights of dispersed metallic SWNTs, where the different heights at the points indicated by the arrows are due to whether the measured metallic SWNTs are individual nanotubes or two, three or other number of nanotubes are still bundled together.

In the top graph in FIG. 2, two arrows are shown each at three positions. The heights of metallic SWNTs indicated by the right arrows at the respective positions are explained. The right arrow at the left position indicates the height of one SWNT that has been separated from bundled SWNTs, where the specific height is approx. 1.08 nm. The SWNT height indicated by the right arrow at the center position is approx. 0.89 nm. On the other hand, the SWNT height indicated by the right arrow at the right position is approx. 2.10 nm. At the right position, at least several SWNTs are bundled in the axial direction of the probe (i.e., vertical direction), and are not yet separated into individual nanotubes.

Figure 3:
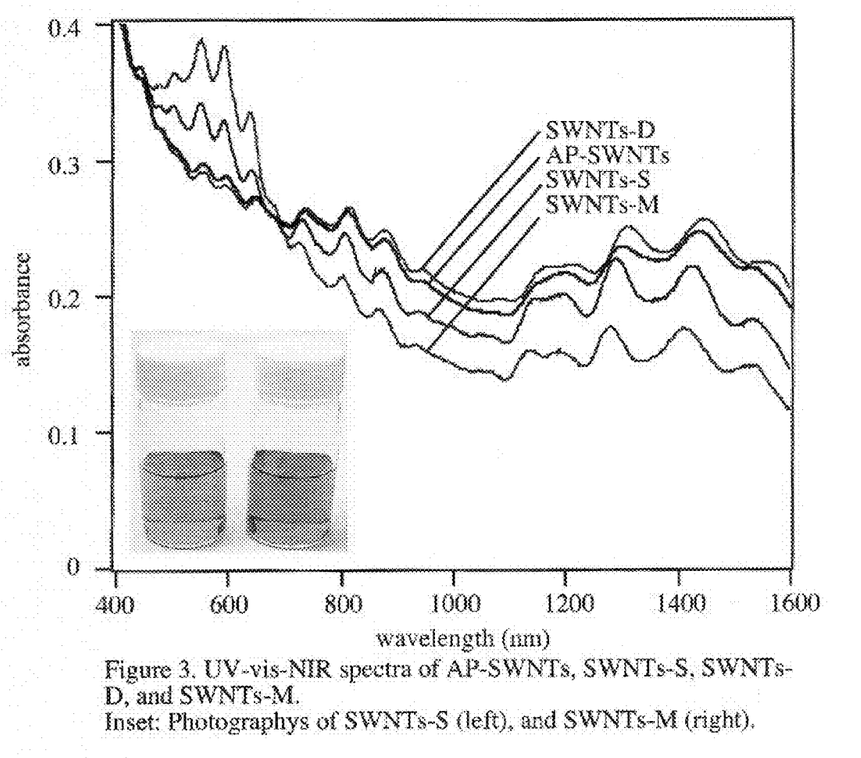
FIG. 3 shows vis-NIR spectra of SWNTs, SWNTs-S, a sediment containing non-dispersible semiconducting SWNTs obtained by centrifuging a sonicated dispersion (SWNTs-D), and a supernatant containing concentrated metallic SWNTs obtained by filtering and re-centrifuging SWNTs-S (SWNTs-M).

FIG. 3 shows a graph illustrating the results of absorption spectrum measurement of SWNTs in the respective conditions as obtained by the method explained in the above example. To be specific, this absorption spectrum measurement was performed using a vis-NIR (visible near-infrared spectrophotometer).

To repeat the aforementioned explanation, in the above example purchased SWNTs (brand name: HiPco Tube) were added to a dispersion (octylamine tetrahydrofuran solution) to cause SWNTs to interact with the amine, after which the dispersion was sonicated to obtain a dispersion containing dispersed metallic SWNTs and non-dispersible semiconducting SWNTs (sonicated dispersion). The analyzed specimens shown in FIG. 3 are specified below.

(a) "AP-SWNTs" are SWNTs obtained by filtering the sonicated dispersion.

(b) "SWNTs-S" represents a supernatant in which metallic SWNTs obtained by centrifuging the sonicated dispersion are dispersed.

(c) "SWNTs-M" represents a supernatant in which concentrated metallic SWNTs obtained by filtering and re-centrifuging SWNTs-S are dispersed.

(d) "SWNTs-D" represents a sediment in which semiconducting SWNTs obtained by centrifuging the sonicated dispersion are contained in a non-dispersible state.

FIG. 3 shows an absorption spectra of 400 to 1,600 nm. The absorption spectra in FIG. 3 indicate the first interband transition for metallic SWNTs (400 to 650 nm), as well as the first interband transition (900 to 1,600 nm) and second interband transition $S_{22}$ (550 to 900 nm) for semiconducting SWNTs.

According to FIG. 3, the absorption spectrum of SWNTs-S (b) has a microstructure (sharp peaks) in a range of 400 to 650 nm, suggesting that metallic SWNTs were efficiently unbundled into individual nanotubes via addition of the amine to the THF solution. Those skilled in the art are well aware that when SWNTs are dispersed in an individual state, the absorption spectrum of SWNTs exhibits a microstructure, as shown above.

Also, FIG. 3 shows peaks for both the supernatant solutions and sediment, but the peaks of the supernatants (SWNTs-S and SWNTs-M) are more prominent than those of the sediment (SWNTs-D).

Also, SWNTs-M after the second centrifugation show a selectively greater absorption (absorbent band) at the first interband transition (400 to 650 nm) for metallic SWNTs, compared to SWNTs-S after the first centrifugation. However, SWNTs-M show a selectively smaller absorption (absorbent band) at the first interband transition (900 to 1,600 nm) and second interband transition $S_{22}$ (550 to 900 nm) for semiconducting SWNTs.

This suggests that by repeating centrifugation, separation of metallic SWNTs and semiconducting metallic SWNTs is promoted, i.e., both SWNTs are concentrated. On the other hand, it is clear from the absorption spectrum of SWNTs-D (sediment) that SWNTs-D (sediment) are concentrated semiconducting SWNTs.

In the above example, an octylamine solution was used as the dispersion, as an example of primary amine. However, the dispersion can be a solution of any amine other than a primary amine, or an amine solution containing a secondary amine, tertiary amine, aromatic amine or amide can also be used. The inventors conducted similar experiments to those explained above on dispersions containing these and obtained results indicating similar dispersion efficiency. Therefore, it is assumed that the basicity of amines and length and number of alkyl chains contribute to this high dispersion efficiency.

As shown by the analysis results in FIG. 3 above, the absorption band for semiconducting SWNTs decreases selectively, while the absorption band for metallic SWNTs increases. These results clearly show that in the above example, SWNTs can be separated very effectively through dispersion of semiconducting SWNTs and metallic SWNTs based on their electrical characteristics, followed by a centrifugation process.

To further condense metallic SWNTs, SWNTs-S obtained by centrifugation (supernatant containing dispersed metallic SWNTs) were filtered and then the aforementioned dispersion-centrifugation process was repeated.

FIG. 3 shows the absorption spectrum of the obtained supernatant (SWNTs-M). The supernatant in the left bottle shown in FIG. 3 is SWNTs-S, while the supernatant in the right bottle is SWNTs-M. The supernatant in the left bottle is green, while the supernatant in the right bottle is purple, although the difference is not clear as FIG. 3 is not in color.

The absorption spectrum of SWNTs-M, obtained by repeating the dispersion-centrifugation process after filtration as explained above, exhibits strong metallic transition and weak semiconducting transition. To be specific, the spectrum shows strong absorption of SWNTs-M at the first interband transition for metallic SWNTs (400 to 650 nm), and weak absorption at the first interband transition (900 to 1,600 nm) and second interband transition $S_{22}$ (550 to 900 nm) for semiconducting SWNTs. This suggests that the aforementioned repetition of the dispersion-centrifugation process has the effect of concentrating metallic SWNTs.

As mentioned above, the present invention allows metallic SWNTs to interact with the amine more strongly due to the strong electron-accepting ability of metallic SWNTs with respect to amines. Since this is also an important factor in the separation of SWNTs based on the electrical characteristics of amines, even after the bundled SWNTs have been dispersed by ultrasonic waves the metallic SWNTs are not bundled again but remain dispersed in the dispersion to be effectively separated.

This is proven by the increased absorption observed at the first interband transition (400 to 650 nm) for metallic SWNTs, as shown in FIG. 3, with respect to SWNTs-M obtained by repeating the separation-centrifugation process in the example.

Raman spectroscopy is an effective tool with which to understand the diameter and electrical characteristics of SWNTs. FIG. 4 shows Raman spectra obtained by measuring SWNTs with an excitation frequency of 514.5 nm. In FIG. 4, "AP-SWNTs" are in film form resulting from the filtration of AP-SWNTs in the above example, while "SWNTs-M" are also in film form resulting from the filtration of SWNTs-M in the above example.

Figure 4:
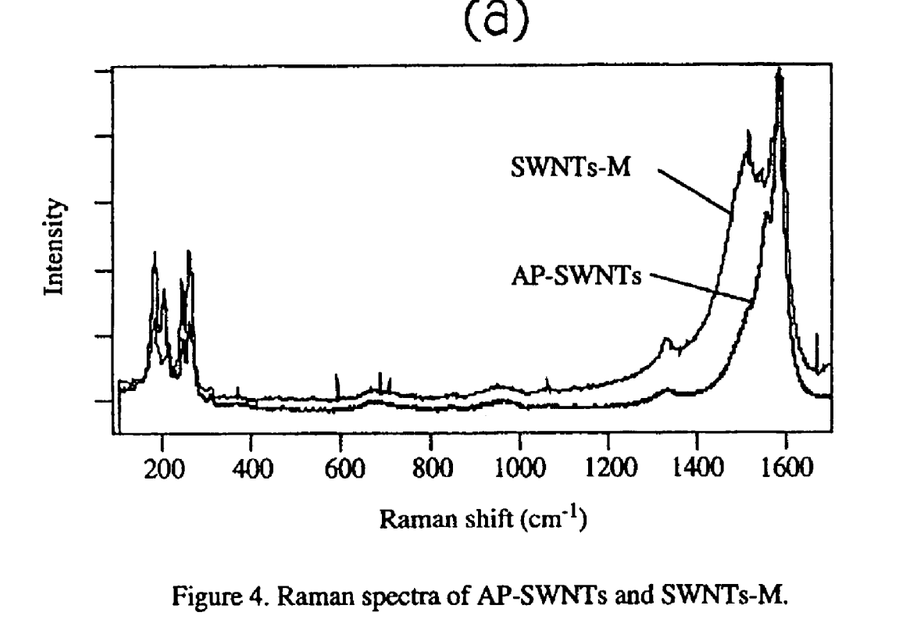
FIG. 4 shows Raman spectra AP-SWNTs and SWNTs-M.

In FIGS. 4 (a) and (b), the diameters of SWNTs are estimated to be in a range of approx. 0.9 to 1.3 nm based on the radical breathing modes (RBM; well-known characteristic peaks in Raman spectra of SWNTs, showing up in a range of 100 to 300 $cm^{-1}$).

Also from the detailed comparison based on the Kataura plot (already known to those skilled in the art before the present application for patent) finds that Raman spectra in ranges of 160 to 200 $cm^{-1}$ and 200 to 280 $cm^{-1}$ are assigned to semiconducting SWNTs and metallic SWNTs (i.e., indicative of the characteristics derived from semiconducting SWNTs and metallic SWNTs), respectively.

The intensity ratio between the Raman spectra of AP-SWNTs and SWNTs-M is very different in a range of 160 to 280 $cm^{-1}$, which proves that metallic SWNTs have been concentrated after the state of SWNTs changed from AP-SWNTs to SWNTs-M.

According to the often-quoted study by Dresselhaus and co-workers, the tangential G band near 1,600 $cm^{-1}$ is a characteristic Raman line shape that can be readily distinguished between metallic SWNTs and semiconducting SWNTs. In FIGS. 4 (a) and (c), a strong Breit-Wigner-Fano line component is observed for SWNTs-M in the tangential G band, which proves that metallic SWNTs have been concentrated.

As shown in FIG. 4 (b), the present invention achieved a concentration ratio of metallic SWNTs over semiconducting SWNTs (quantity of SWNTs-M/quantity of AP-SWNTs) of 7.2. This indicates that the dispersion-centrifugation process in the example conforming to the present invention can separate metallic SWNTs and semiconducting SWNTs very effectively. The integral value ratio between the ranges of 160 to 200 $cm^{-1}$ and 200 to 280 $cm^{-1}$ in Raman spectra allows for estimation of the ratio of semiconducting SWNTs and metallic SWNTs by quantity.

The foregoing explained the preferred embodiments pertaining to the present invention. However, the present invention is not restricted to those discussed above. For example, any aromatic, straight-chain or branched C1-C18 amines can be used instead of octylamine. Any amine can be used as long as it has strong interaction with metallic SWNTs, such as a primary amine other than octylamine, secondary amine, tertiary amine, aromatic amine, or amide.

In the above example, a solution containing tetrahydrofuran (THF) as a solvent was used as the amine solution. However, the solvent is not limited to THF and any other solvent can be used as long as it is amphiphilic with amines. Possible solvents include alcohols, glycols and dimethyl sulfoxide (DMSO). Additives such as surfactants and defoamers can also be added to the amine solution.

The period of sonication can be adjusted within a range of 1 minute to 168 hours.

In the above example, centrifugation was conducted for 12 hours at a force of 45,620 G as the separation means. However, centrifugation may be performed for any period between 1 minute and 168 hours at a force of 100 to 100,000 G. The means to remove semiconducting SWNTs in a non-dispersible state (non-dispersible SWNTs) is not limited to centrifugation, and in addition to centrifugation, filtration, sedimentation and other methods can also be used.

By changing the specific gravity of solvent, the relative specific gravity of non-dispersible semiconducting SWNTs (non-dispersible SWNTs) relative to the dispersion can be changed, which allows for control of the quantity of semiconducting SWNTs to be separated from metallic SWNTs in the process of separating non-dispersible semiconducting SWNTs.

Methods of separation other than centrifugation and filtering include distillation of the solvent, heating or cooling of the dispersion, mixing of additives (such as nonpolar solvents, polar solvents, salts, acids, alkalis, metallic ions, solvents having high hydrocarbon solubility, reducing agents, oxidizing agents, polymers or organic molecules having interaction with pi-electron groups, surfactants, and other components), chromatography, dielectrophoresis, sedimentation, floatation separation, or any combination of the foregoing.

Under the present invention, the means to remove the amine from the obtained metallic SWNTs or semiconducting SWNTs may be solvent washing, heating, or decompression. Examples of solvents that can be used in solvent washing include those based on ethanols, ethers, aliphatic ethers and aliphatic hydrocarbons.

It is to be understood that the foregoing descriptions and specific embodiments shown herein are merely illustrative of the best mode of the invention and the principles thereof, and that modifications and additions may be easily made by those skilled in the art without departing for the spirit and scope of the invention, which is therefore understood to be limited only by the scope of the appended claims.

INDUSTRIAL FIELD OF APPLICATION

The present invention allows metallic SWNTs and semi-conducting SWNTs to be separated from bundled SWNTs using a simple method in large scales and quantities by utilizing their respective electrical characteristics, without changing the structure or electrical characteristics of either SWNTs. This opens the door to carbon-nanotube-based applications in nanomaterial in various industrial fields.

The invention claimed is:

1. A method of separating carbon nanotubes by dispersing metallic carbon nanotubes included in carbon nanotubes and then separating said metallic carbon nanotubes from semi-conducting carbon nanotubes that did not disperse, characterized by comprising:

adding to an amine solution the carbon nanotubes from which metallic carbon nanotubes are to be dispersed, without pretreating the carbon nanotubes by oxidization nor by heating;

selectively unbundling the metallic carbon nanotubes in the amine solution relative to the semiconducting carbon nanotubes, said selective unbundling consisting of sonication of the amine solution conducted to unbundle the metallic carbon nanotubes as individual nanotubes, wherein as a result of subjecting to sonication the amine solution including the carbon nanotubes without the pretreatment, bundled carbon nanotubes in the amine solution are unbundled in conditions wherein metallic carbon nanotubes, to which the amine is physically more adsorbed than to semiconducting carbon nanotubes, do not return to a bundled state but remain dispersed in the dispersion while semiconducting nanotubes having weaker interaction with the amine than do metallic carbon nanotubes remain entangled with one another; and separating entangled carbon nanotubes as semiconducting carbon nanotubes from said amine solution by centrifugation.

2. The method of carbon nanotube separation according to claim 1, wherein the amine solution contains a solvent amphiphilic with amines.

3. The method of carbon nanotube separation according to claim 1, characterized in that the amine solution is a primary amine, secondary amine, tertiary amine or aromatic amine solution.

4. The method of carbon nanotube separation according to claim 1, characterized in that the carbon nanotubes are single-walled carbon nanotubes.

5. The method of carbon nanotube separation according to claim 1, wherein separation is controlled in the step of separating non-dispersed carbon nanotubes, by replacing the solvent with another solvent having a different specific gravity in the solution in which the metallic carbon nanotubes are dispersed.

6. The method of carbon nanotube separation according to claim 1, characterized in that the step of separating non-dispersed carbon nanotubes achieves selective separation of the semiconducting carbon nanotubes by diameter by utilizing the fact that the semiconducting carbon nanotubes have different electrical characteristics in accordance with their diameter.

* * * * *